(12) United States Patent
Pollock

(10) Patent No.: US 6,513,344 B1
(45) Date of Patent: Feb. 4, 2003

(54) CONTAINER AND TRAY COMBINATION FOR MAINTENANCE OF AN ELEVATED OR DEPRESSED TEMPERATURE IN A FOOD PRODUCT

(76) Inventor: Raymond Lyle Pollock, 609 Hawksbill Island Dr., Satellite Beach, FL (US) 32937

( * ) Notice: Subject to any disclaimer, the term of this patent is extended or adjusted under 35 U.S.C. 154(b) by 0 days.

(21) Appl. No.: 10/117,277

(22) Filed: Apr. 5, 2002

(51) Int. Cl.⁷ .................................................. F25D 3/08
(52) U.S. Cl. .................... 62/457.6; 62/457.1; 62/457.2; 62/457.3; 62/457.4; 62/457.5; 62/457.7; 62/457.8; 62/457.9
(58) Field of Search .............................. 62/457.1–457.9

(56) References Cited

U.S. PATENT DOCUMENTS

| | | | |
|---|---|---|---|
| 3,983,999 A | | 10/1976 | Morton |
| D250,880 S | | 1/1979 | Stone et al. |
| 4,182,405 A | * | 1/1980 | Hysen et al. ................. 165/48 |
| 4,304,106 A | * | 12/1981 | Donnelly ..................... 62/457 |
| 4,781,243 A | * | 11/1988 | DeVogel et al. ............... 165/47 |
| 4,936,377 A | * | 6/1990 | DeVogel et al. ............... 165/47 |
| 5,176,314 A | | 1/1993 | Akazawa et al. |
| 5,669,233 A | * | 9/1997 | Cook et al. ..................... 62/371 |
| 5,839,590 A | * | 11/1998 | Weiner ......................... 206/577 |
| D417,146 S | | 11/1999 | St. Pierre et al. |
| 6,044,650 A | * | 4/2000 | Cook et al. ................... 62/130 |
| 6,086,931 A | | 7/2000 | Whiteford |
| 6,117,465 A | | 9/2000 | Falla |
| 6,450,343 B1 | * | 9/2002 | Arnaldi ....................... 206/769 |

* cited by examiner

Primary Examiner—William C. Doerrler
Assistant Examiner—Mark Shulman
(74) Attorney, Agent, or Firm—Gene Scott-Patent Law & Venture Group

(57) ABSTRACT

A combination includes a tray providing a flat upwardly facing surface and a plurality of raised edges forming compartments on the flat surface. The tray is made, in part, of a material adapted for phase changing thermal absorption such as, so called, blue-ice. A plurality of food containers each have a flat bottom surface adapted for intimate contact with the flat surface of the tray. The containers also provide a peripheral bottom edge adapted for snap engagement with the raised edges of the tray for holding the containers on the tray.

12 Claims, 2 Drawing Sheets

CONTAINER AND TRAY COMBINATION FOR MAINTENANCE OF AN ELEVATED OR DEPRESSED TEMPERATURE IN A FOOD PRODUCT

BACKGROUND OF THE INVENTION

1. Field of the Invention

This invention relates generally to food containers and more particularly to a container combination providing improved convenience, storage capacity and controlled temperature.

2. Description of Related Art

The following art defines the present state of this field:

Stone et al., U.S. Pat. No. Des. 250,880 describes a compartmented food package design.

St. Pierre et al., U.S. Pat. No. Des. 417,146 describes a multi-container package design.

Morton, U.S. Pat. No. 3,983,999 describes a multi-container package for articles, such as orange juice in a frozen state, which includes a lid panel separated by divider zones or perforated zones into equi-spaced lid portions and a container means suspended beneath each lid portion and including sealing means to hold the lid portions to the container means.

Akazawa et al., U.S. Pat. No. 5,176,314 describes an easily openable sealed container consisting of a lid and a main body having a flange, wherein a sealing layer of the main body or a sealing layer of the lid has a number of microdents in the flange portion, the thickness of said sealing layer is 10–1000 .mu., said sealing layer and an adjacent layer contacting therewith have a lamination strength of 300–2,000 g/25 mm width, and said sealing layer and the lid or the main body are sealed in the flange portion at a strength larger than said lamination strength, as well as a process for producing said sealed container.

Whiteford, U.S. Pat. No. 6,086,931 describes a sealed egg package including a cup-shaped receptacle formed of transparent thermoplastic material which encloses and resiliently supports an egg therein. The receptacle is closed by a cover sheet adhesively sealed to the rim of the receptacle. The closed receptacle insulates the egg from the air and inhibits evaporation of water and escape of carbon dioxide from the egg. A gaseous atmosphere such as carbon dioxide, sealed within the receptacle and surrounding the egg protects the egg against deterioration.

Falla, U.S. Pat. No. 6,117,465 describes an environmentally friendly polymer film pouch made from a polyethylene film structure for the packaging of flowable materials, for example milk, including, for example, a pouch made from a monolayer or multilayer film structure such as a two-layer or a three-layer coextruded film containing at least one layer of a blend of a linear ethylene interpolymer and a high pressure low density polyethylene as a seal layer. Also disclosed is a process for making a pouch for packaging flowable materials using a film structure of a blend of a linear ethylene interpolymer and a high pressure low density polyethylene.

The prior art teaches the use of containers for food products, but does not teach a container and tray combination capable of keeping the container cold or hot. The present invention fulfills these needs and provides further related advantages as described in the following summary.

SUMMARY OF THE INVENTION

The present invention teaches certain benefits in construction and use which give rise to the objectives described below.

A combination includes a tray providing a flat upwardly facing surface and a plurality of raised edges forming compartments on the flat surface. The tray is made, in part, of a material adapted for phase changing thermal absorption such as, so called, blue-ice. A plurality of food containers, each have a flat bottom surface adapted for intimate contact with the flat surface of the tray. The containers also provide a peripheral bottom edge adapted for snap engagement with the raised edges of the tray for holding the containers on the tray.

A primary objective of the present invention is to provide an apparatus and method of use of such apparatus that provides advantages not taught by the prior art.

Another objective is to provide such an invention capable of storing a food product at low temperature.

A further objective is to provide such an invention capable of being reused.

A still further objective is to provide such an invention capable of compact storage.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above described drawing figures illustrate the invention in at least one of its preferred embodiments, which is further defined in detail in the following description.

Figure 1:
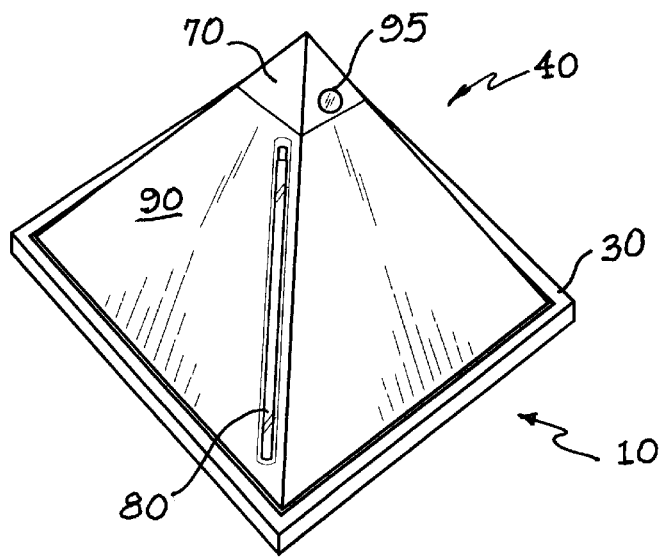
FIG. 1 is a perspective view of the preferred embodiment of the invention showing a single container on a single tray.
Figure 2:
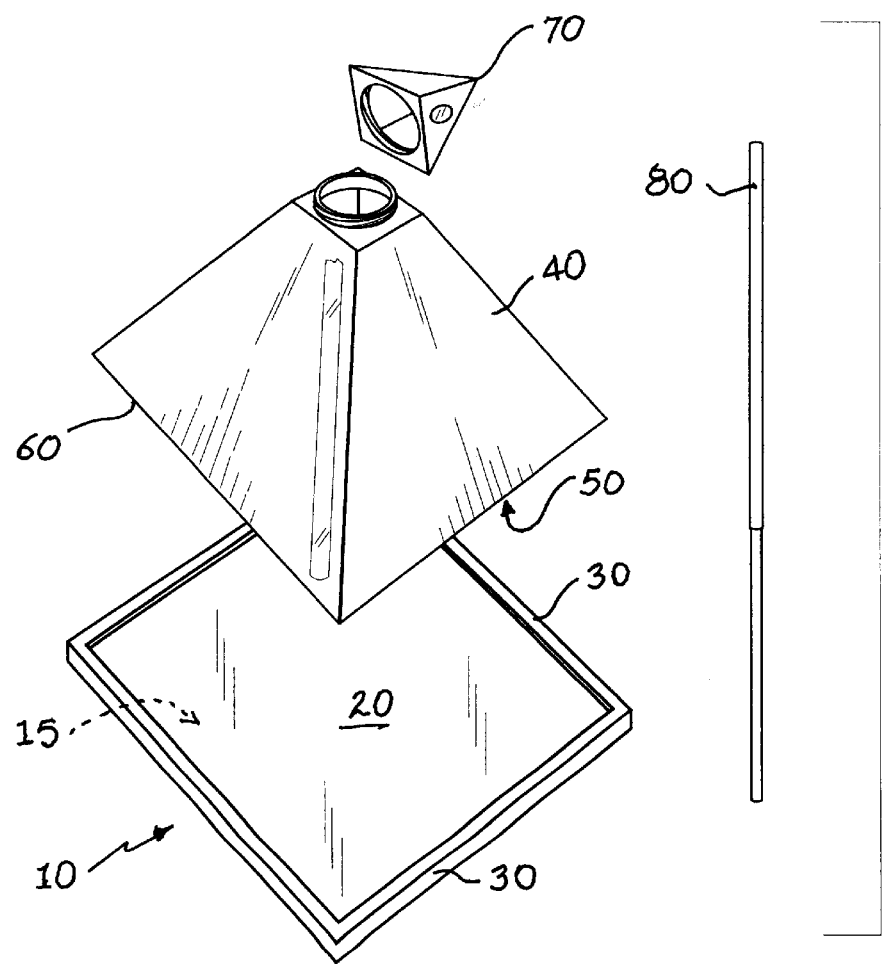
FIG. 2 is an exploded view thereof.
Figure 3:
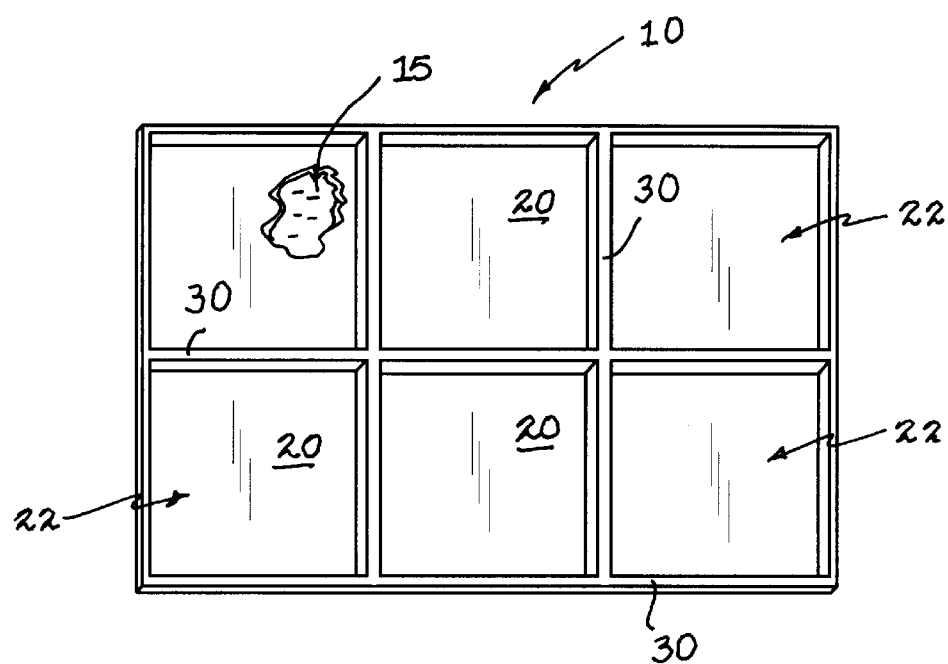
FIG. 3 is a plan view of a tray of the invention for accommodating six containers.

The present invention is a container apparatus comprising in combination: a tray 10 providing a flat upwardly facing surface 20 and a plurality of raised edges 30 forming compartments 22 on the flat surface 20. The tray 10 is preferably made, in part, of a material 15 adapted for phase changing thermal absorption; and this may be water, so called blue ice, etc. The tray is preferably a plastic container itself with the phase changing material 15 stored inside of it. The tray 10 is placed in a freezer to solidify the phase change material prior to use. Alternately, the tray may be heated with the phase material 15 absorbing a large number of calories to be later transferred to a container 40; either a single, or a plurality of such food containers 40 each have a flat bottom surface 50 adapted by its flatness for intimate contact with the flat surface 20 of the tray 10. A peripheral bottom edge 60 of the container 40 is adapted for snap engagement with the raised edges 30 of the tray 10 and this arrangement is designed to hold the containers 40 in place in the tray 10 until they are used. Preferably, the food containers 40 are each pyramidal shaped so that with the trays 10 with the containers 40 stacked, each alternate tray 10 may be inverted with the containers 40 fitting in overlapped arrangement. This allows the product to be stored with a compact figure of about 55%, i.e., taking up about 55% of the space ordinarily taken by such products. Preferably, the food containers 40 each provide a removable cap 70 adapted for enabling access to an interior of the food container 40 as shown in FIG. 2. Preferably, the food containers 40 each further comprise a straw 80 attached to a side surface 90 of the food container 40. This is shown in FIG. 1. The straw is so attached as to be easily removable for use with the container 40, as is well known in the art, i.e., using a wax. To facilitate this, each of the containers provide a puncture window 95 for insertion of the straw 80 into the container 40. This is also well known. Preferably, the puncture window 40 is positioned in the cap 70 so that the container 40 may be reused by fitting an alternate non-punctured cap 70.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A container apparatus comprising in combination: a tray providing a flat upwardly facing surface and a raised edge peripheral to the flat surface, the tray made in part of a material adapted for phase changing thermal absorption; and a food container having a flat bottom surface adapted for intimate contact with the flat surface of the tray, and a peripheral bottom edge adapted for snap engagement within the peripheral edge of the tray.

2. The apparatus of claim 1 wherein the food container is pyramidal shaped.

3. The apparatus of claim 2 wherein the food container provides a removable cap adapted for enabling access to an interior of the food container.

4. The apparatus of claim 1 wherein the food container further comprises a straw attached to a side surface of the food container; the straw so attached as to be easily removable for use with the container.

5. The apparatus of claim 4 wherein the food container provides a puncture window for insertion of the straw into the container.

6. The apparatus of claim 4 wherein the puncture window is positioned in the cap.

7. A container apparatus comprising in combination: a tray providing a flat upwardly facing surface and a plurality of raised edges forming compartments on the flat surface, the tray made in part of a material adapted for phase changing thermal absorption; and a plurality of food containers each having a flat bottom surface adapted for intimate contact with the flat surface of the tray, and a peripheral bottom edge adapted for snap engagement with the raised edges of the tray.

8. The apparatus of claim 7 wherein the food containers are each pyramidal shaped.

9. The apparatus of claim 8 wherein the food containers each provide a removable cap adapted for enabling access to an interior of the food container.

10. The apparatus of claim 7 wherein the food containers each further comprise a straw attached to a side surface of the food container; the straw so attached as to be easily removable for use with the container.

11. The apparatus of claim 10 wherein the food containers each provide a puncture window for insertion of the straw into the container.

12. The apparatus of claim 11 wherein the puncture window is positioned in the cap.

* * * * *